United States Patent [19]

Seay, Jr.

[11] Patent Number: 4,777,884
[45] Date of Patent: Oct. 18, 1988

[54] VEHICLE TURNTABLE

[76] Inventor: George A. Seay, Jr., Rte. 2, Box 91, Moneta, Va. 24121

[21] Appl. No.: 41,685

[22] Filed: Apr. 23, 1987

[51] Int. Cl.$^4$ ............................................. B60S 13/02
[52] U.S. Cl. ........................................ 104/42; 104/36; 104/44
[58] Field of Search ...................... 104/36, 38, 40, 42, 104/44, 46; 105/28

[56] References Cited

U.S. PATENT DOCUMENTS

| | | | |
|---|---|---|---|
| 1,617,063 | 2/1927 | Layton | 104/42 |
| 1,665,997 | 4/1928 | Austin | 104/42 |
| 1,768,014 | 6/1930 | Thompson | 104/44 |
| 3,566,798 | 3/1971 | Peitzman | 104/44 |
| 4,172,422 | 10/1979 | McBride | 104/44 |
| 4,562,774 | 1/1986 | Dehring | 104/44 |
| 4,608,929 | 9/1986 | Park | 104/44 |

FOREIGN PATENT DOCUMENTS 1185253  3/1970  United Kingdom ................. 104/44

Primary Examiner—George L. Walton
Attorney, Agent, or Firm—Leon Gilden

[57] ABSTRACT

An automatically operated turntable is designed to reverse the direction of a vehicle parked in a driveway. The turntable is pivotally mounted on a rotatable shaft, and a small gear driven motor is utilized to rotate the turntable. Inasmuch as the front of an automobile is heavier than the rear end, when the vehicle is parked forwardly on the turntable, a weight sensitive switch activates the motor to effect a rotation of the turntable. When the vehicle has rotated 180 degrees, the opposite tilting of the table deactivates the weight sensitive switch so as to disable the motor drive.

3 Claims, 2 Drawing Sheets

VEHICLE TURNTABLE

BACKGROUND OF THE INVENTION

1. Field of the Invention

The present invention relates to vehicle turntables, and more particularly pertains to a new and improved vehicle turntable which is automatically operated by a pressure sensitive switch.

2. Description of the Prior Art

Turntables for automobiles which permit a vehicle to enter upon a turntable along a given path and which are then operable to rotate the vehicle 180 degrees so that the vehicle may leave the turntable in an opposed direction are well known in the prior art. Some typical examples of these prior art automobile turntables are found in U.S. Pat. No. 3,566,798 which issued to H. Peitzman on Mar. 2, 1971, U.S. Pat. No. 4,172,422 which issued to P. McBride on Oct. 30, 1979, and U.S. Pat. No. 4,562,774 which issued to A. Dehring on Jan. 7, 1986.

While all these prior art devices are most likely functional for their intended purposes, it will be observed that each of them includes complex design features which would result in substantial manufacturing expenses during a commercial production thereof. Further, only one of these devices, i.e., the Dehring turntable, is designed to be automatically operable. In this regard, the Dehring turntable is designed upon the principle of vehicle imbalance occasioned by the forward engine-holding portion of the vehicle being heavier that the rear portion, and then relies upon this imbalance to effect table rotation. Again however, substantially complex design features are utilized to effect turntable rotation and accordingly, there would appear to be a continuing need for new and improved vehicle turntables which would be automatically operable and which would be simple to manufacture and install. In this regard, the present invention addresses this need.

SUMMARY OF THE INVENTION

In view of the foregoing disadvantages inherent in the known types of vehicle turntables now present in the prior art, the present invention provides an improved vehicle turntable which is automatically operable to rotate a vehicle 180 degrees in response to a sensed weight of the vehicle on the table. As such, the general purpose of the present invention, which will be described subsequently in greater detail, is to provide a new and improved vehicle turntable which has all the advantages of the prior art vehicle turntables and none of the disadvantages.

To attain this, the present invention comprises a rotatable turntable pivotally mounted upon a gear drive associated with an electrically-powered motor. The turntable is allowed to pivotally move for a preselected distance upon the rotatable shaft so as to selectively activate and deactivate a pressure sensitive switch positioned beneath the table. When a vehicle is parked upon the turntable, the heavier forward end of the vehicle will effect a closing of the electrical circuit controlled by the pressure sensitive switch positioned beneath the table, and the gear drive motor will then rotate the table until the switch is deactivated. In this regard, once the vehicle has rotated approximately 180 degrees, the table will then pivotally tilt in a reverse direction so as to deactivate the switch, thereby causing a cessation of rotation of the table. Accordingly, the vehicle has thus been rotated 180 degrees within the driveway so as to be pointed in a forwardly moving direction during an exiting from the driveway.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle turntable which has all the advantages of the prior art vehicle turntables and none of the disadvantages.

It is another object of the present invention to provide a new and improved vehicle turntable which may be easily and efficiently manufactured and marketed.

It is a further object of the present invention to provide a new and improved vehicle turntable which is of a durable and reliable construction.

An even further object of the present invention is to provide a new and improved vehicle turntable which is susceptible of a low cost of manufacture with regard to both materials and labor, and which accordingly is then susceptible of low prices of sale to the consuming public, thereby making such vehicle turntables economically available to the buying public.

Still yet another object of the present invention is to provide a new and improved vehicle turntable which provides in the apparatuses and methods of the prior art some of the advantages thereof, while simultaneously overcoming some of the disadvantages normally associated therewith.

Still another object of the present invention is to provide a new and improved vehicle turntable which permits an automobile to be rotated into an opposite direction without the necessity of maneuvering a broken U-turn within a driveway.

Yet another object of the present invention is to provide a new and improved vehicle turntable which is automatically operable to rotate a vehicle parked thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
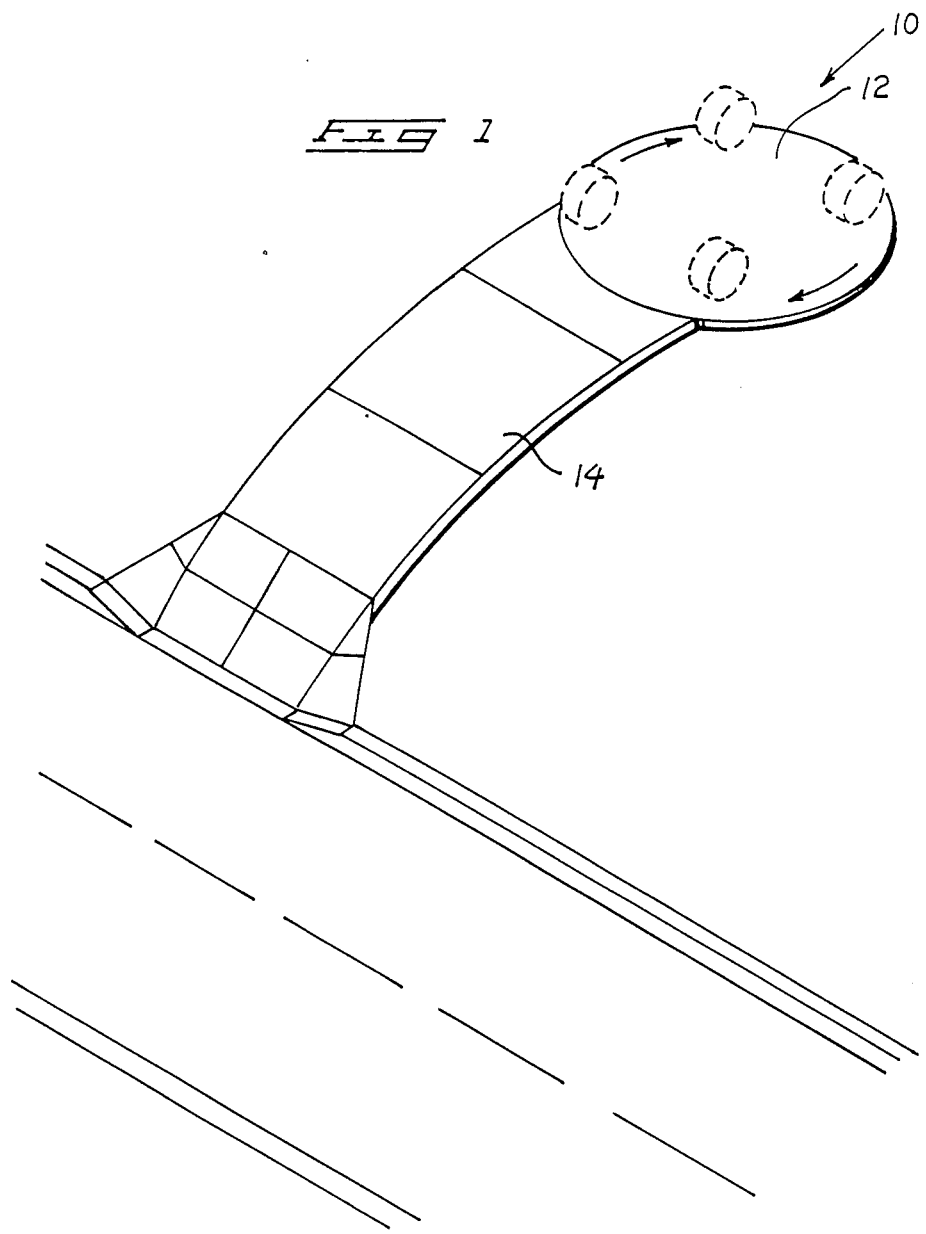
FIG. 1 is a perspective view of the vehicle turntable comprising the present invention.
Figure 2:
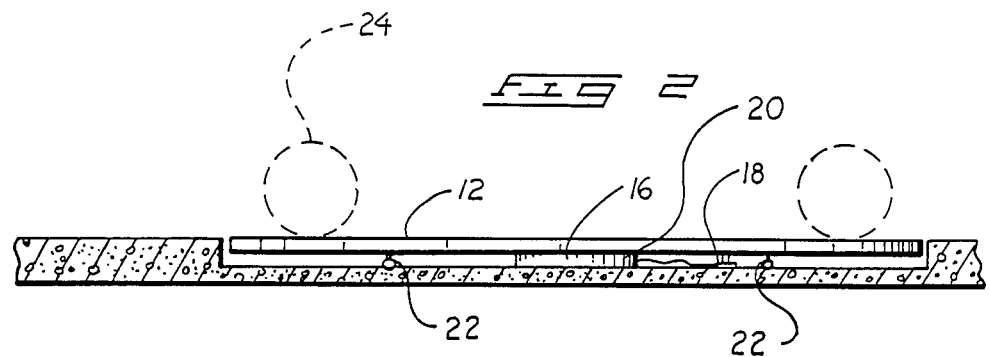
FIG. 2 is a side elevation view, partly in cross section, of the turntable.
Figure 3:
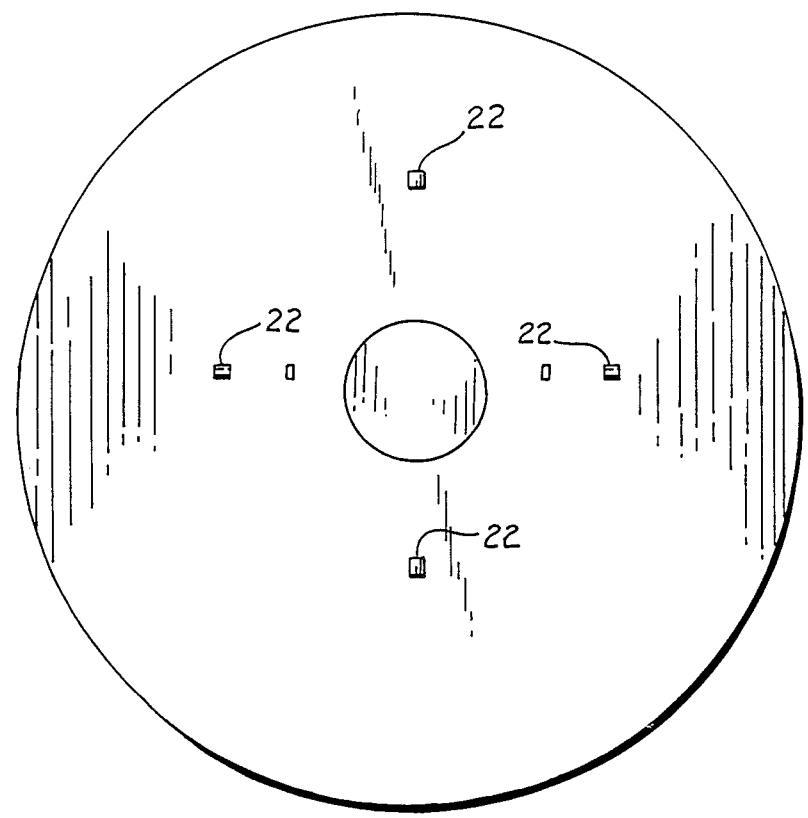
FIG. 3 is a bottom plan view of the turntable.

With reference now to the drawings, and in particular to FIGS. 1, 2 and 3 thereof, a new and improved vehicle turntable embodying the principles and concepts of the present invention and generally designated by the reference numeral 10 will be described.

More specifically, it will be noted that the automobile turntable 10 includes a circular vehicle-supporting platform 12 designed to be operably rotatably installed within a conventional driveway 14. The platform 12 is both rotatable about and slightly pivotal upon a support shaft 16. The support shaft 16 effectively comprises a housing having a conventional ring gear and electrically powered motor operably attached to the ring gear. A pressure sensitive switch 18 is mounted beneath the platform 12 and is operable to open and close the power circuit to the drive motor retained within the housing 16.

To permit pivotal movement of the vehicle supporting platform 12 upon the shaft 16, the platform is supported upon the shaft by a compressible resilient member 20. In a preferred embodiment, the compressible member 20 could comprise a thick layer of elastomeric material, such as rubber or the like, or alternatively, a plurality of springs could be mounted around the periphery of the shaft. In any event, the compressible member 20 facilitates a tilting of the platform 12 relative to the drive shaft 16 while also serving as a securing means between the shaft and platform to thus facilitate concurrent rotatable movement therebetween.

As best illustrated in FIGS. 2 and 3, the circular platform 12 would most desirably be formed of a lightweight strong material, such as aluminum or the like, and rotatable movement thereof would be assisted by a plurality of bearings or wheels 22 selectively affixed at various locations along a bottom surface of the platform. To accommodate tilting movement of the platform 12 relative to the drive shaft 16, the wheels 22 would have to be mounted on telescoping spring-biased shafts so that their relative distance beneath the platform could be varied in response to platform tilting.

As to the manner of usage and operation of the invention 10, it can be appreciated that a vehicle, as represented by the numeral 24, would be parked upon the platform 12 prior to a rotation thereof. Inasmuch as a forward portion of the vehicle contains the vehicle engine and is thus heavier than the rearward portion, the platform 12 will tilt forwardly so as to close the circuit associated with the pressure sensitive switch 18. Electric power is then provided to the drive motor retained within the drive shaft housing 16, and the conventional gear assembly then operably rotates the complete shaft 16 to effect a concurrent rotation of the platform 12. Once the platform 12 has rotated approximately 180 degrees, so as to reverse the direction of the vehicle 24 parked thereon, an opposite tilting of the platform 12 will open the circuit associated with the pressure sensitive switch 18, and further rotation of the platform will then cease.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle turntable for automatically reversing the direction of a vehicle parked thereon, said turntable comprising:

circular vehicle supporting platform means;

drive means for operably rotating said supporting platform means; and switch means for operably controlling said drive means, said switch means being responsive to a sensed weight of said vehicle, and wherein said switch means is positioned beneath said supporting platform means, and wherein said switch means closes an electric circuit associated with said drive means, thereby to effect an operation of said drive means, and opens said electric circuit to disengage said drive means when said sensed weight decreases by a preselected amount, and further including tilting means associated with said supporting platform means, and wherein said tilting means permits said supporting platform means to operate said switch means, and wherein said tilting means comprises a single and centrally located supporting compressible member positioned coupled between said supporting platform means and said drive means to enable tilting of the supporting platform in response to weight distribution of said vehicle positioned thereon.

2. The new and improved vehicle turntable for automatically reversing the direction of a vehicle parked thereon as described in claim 1, wherein said compressible member comprises an elastomeric member.

3. The new and improved vehicle turntable for automatically reversing the direction of a vehicle parked thereon as described in claim 1, wherein said member comprises a plurality of supporting springs.

* * * * *